United States Patent [19]

D'Amato

[11] 4,318,026

[45] Mar. 2, 1982

[54] METHOD OF MAKING A GRID FOR A CATHODE-RAY TUBE ELECTRON GUN

[75] Inventor: Ralph J. D'Amato, Lancaster, Pa.

[73] Assignee: RCA Corporation, New York, N.Y.

[21] Appl. No.: 145,237

[22] Filed: Apr. 30, 1980

[51] Int. Cl.³ .......................... G03C 5/00; H01J 29/46
[52] U.S. Cl. .................... 313/448; 313/414;
430/314; 430/316; 430/312; 430/4; 430/5;
430/313; 430/318; 430/319; 430/321; 430/394;
430/23; 156/634; 156/644; 156/656; 156/659.1;
156/661.1
[58] Field of Search ................. 430/4, 5, 23, 312, 313,
430/318, 319, 321, 394, 314, 316; 156/634, 644,
656, 659, 661.1; 313/402, 414, 448

[56] References Cited

U.S. PATENT DOCUMENTS

| B 381,074 | 1/1975 | Hasker et al. | 313/449 |
|---|---|---|---|
| 3,008,064 | 11/1961 | Niklas et al. | 313/82 |
| 3,079,163 | 5/1961 | Garaner et al. | 250/27.5 |
| 3,213,311 | 10/1965 | Duerr | 313/82 |
| 3,295,001 | 12/1966 | Burdick et al. | 313/82 |
| 3,374,379 | 3/1968 | Maruyama et al. | 313/85 |
| 3,725,065 | 4/1973 | Fadner | 430/5 |
| 3,730,719 | 5/1973 | Law | 430/5 |
| 3,772,554 | 11/1973 | Hughes | 313/69 C |
| 3,852,608 | 12/1974 | Johanns et al. | 313/449 |
| 3,866,081 | 2/1975 | Hasker et al. | 313/449 |
| 3,909,656 | 9/1975 | Stachniak | 156/644 X |
| 3,955,981 | 5/1976 | Stachniak | 430/5 |
| 3,993,516 | 11/1976 | Prazak et al. | 430/5 |
| 3,995,194 | 11/1976 | Blacker, Jr. et al. | 315/16 |
| 4,008,111 | 2/1977 | Rutz | 156/656 |
| 4,230,781 | 10/1980 | Piascinski et al. | 430/5 |

*Primary Examiner*—Won H. Louie, Jr.
*Attorney, Agent, or Firm*—Eugene M. Whitacre; Dennis H. Irlbeck; Vincent J. Coughlin, Jr.

[57] ABSTRACT

A method of making a grid for a cathode-ray tube includes the process of etching an electrically conductive base member of a first material from two sides through related openings in electrically conductive layers of a second material which overlays the two sides of the base material. Etching continues until an aperture of sufficient size is formed that the overlying layers overhang the aperture in the base member.

3 Claims, 49 Drawing Figures

METHOD OF MAKING A GRID FOR A CATHODE-RAY TUBE ELECTRON GUN

The present invention relates to cathode-ray tube electron guns, and particularly to a method of making an electron gun grid wherein the grid includes two materials and a grid aperture is etched in the grid.

BACKGROUND OF THE INVENTION

Recent improvements in electron guns for use in cathode-ray tubes have been made wherein the shape of the electron gun grid apertures are varied in a three-dimensional manner. Such grid aperture variations are made by appropriate punching and/or coining of a single material grid or by welding two pieces together that have different size and/or shaped apertures punched into them. These methods of achieving aperture change along the electron beam path have been found to be costly and are limited to those geometries which can be punched or coined. Therefore, there is a need for new, relatively inexpensive, methods of making electron gun grids that have apertures that vary in size and/or shape along the electron beam path. Such new methods should also have the potential for making apertures of almost any geometry.

SUMMARY OF THE INVENTION

A method of making a grid for a cathode-ray tube includes the process of etching an electrically conductive base member of a first material from two sides through related openings in electrically conductive layers of a second material which overlie the two sides of the base member. Etching continues until an aperture of sufficient size is formed that the overlying layers overhang the aperture in the base member.

DETAILED DESCRIPTION OF THE PREFERRED EMBODIMENT

Figure 1:
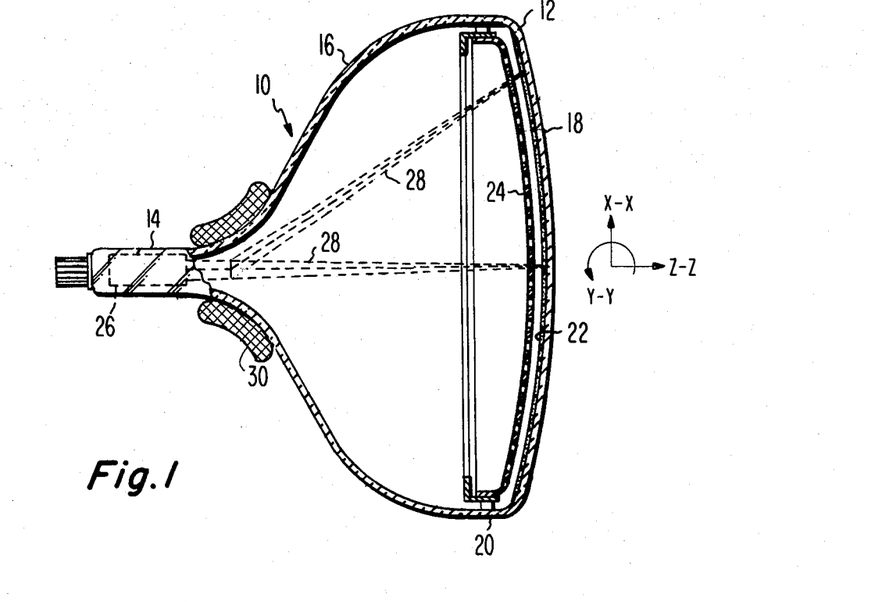
FIG. 1 is a plan view, partly in axial section of a shadow mask color picture tube in which one embodiment of the present invention is incorporated.

FIG. 1 is a plan view of a rectangular color picture tube 10 having a glass envelope 11 comprising a rectangular faceplate panel or cap 12 and a tubular neck 14 connected by a rectangular funnel 16. The panel comprises a viewing faceplate 18 and a peripheral flange or sidewall 20 which is sealed to the funnel 16. A mosaic three-color phosphor screen 22 is carried by the inner surface of the faceplate 18. The screen is preferably a line screen with the phosphor lines extending substantially parallel to the minor axis Y—Y of the tube (normal to the plane of FIG. 1). A multi-apertured color selection electrode or shadow mask 24 is removably mounted, by conventional means, in predetermined spaced relation to the screen 22. An improved inline electron gun 26, shown schematically by dotted lines in FIG. 1, is centrally mounted within the neck 14 to generate and direct three electron beams 28 along coplanar convergent paths through the mask 24 to the screen 22.

The tube 10 of FIG. 1 is designed to be used with an external magnetic deflection yoke, such as the yoke 30 schematically shown surrounding the neck 14 and funnel 12 in the neighborhood of their junction, for subjecting the three beams 28 to vertical and horizontal magnetic flux, to scan the beams horizontally (X—X) and vertically (Y—Y), respectively, in a rectangular raster over the screen 22.

Figure 2:
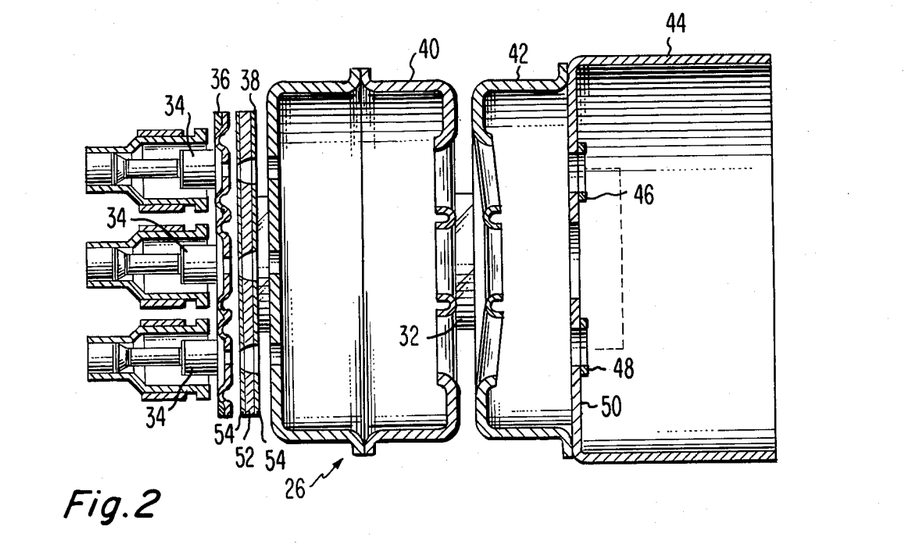
FIG. 2 is an axial section view of the electron gun shown in dashed lines in FIG. 1.
Figure 3:
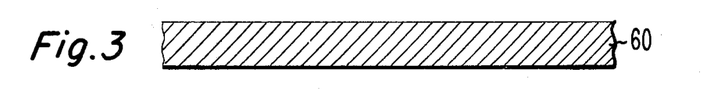
FIGS. 3-10, 11-18, 19-32 and 33-45 are sectional views through an electron gun grid illustrating four different sequences of steps for forming a grid aperture.

The details of the gun 26 are shown in FIG. 2. The gun comprises two glass support rods 32 on which the various electrodes are mounted. These electrodes include three equally spaced coplanar cathodes 34 (one for each beam), a control grid electrode 36, a novel screen grid electrode 38, first and second accelerating and focusing electrodes 40 and 42 respectively, and a nonmagnetically permeable electrical shield cup 44, spaced along the glass rods 32 in the order named. Two magnetically permeable coma correction members 46 and 48 are shown located on the back wall 50 of the shield cup 44.

Further detail of an electron gun similar to the gun 26 of FIG. 2 is contained in U.S. Pat. No. 3,772,554, issued to R. H. Hughes on Nov. 13, 1973. This patent is hereby incorporated by reference for the purpose of including such detail.

Although the present invention is described herein as applied to a cathode-ray tube having a three beam inline electron gun, the novel method also may be used in constructing tubes having other types of electron guns such as single beam electron guns or three beam delta electron guns. Furthermore, although the preferred embodiment applies the novel method to construction of a screen grid electrodes; the novel method also may be used to construct other electron gun electrodes.

The gun 26 shown in FIG. 2 can be constructed utilizing known techniques with the exception of the fabrication of the screen grid electrode 38. This electrode 38 includes two different electrically conductive materials. A base member 52 of a first material is the thickest portion of the electrode 38 and provides most of the rigidity for the electrode 38. Overlying layers 54 of a second material cover the two sides of the base member 52. Although apertures may be formed in the electrode 38 by several variations in the novel method, the preferred variations being described hereinafter, all of the variations include etching the base member 52 through openings in the overlying layers 54 until an aperture of sufficient size is formed that the overlying layers 54 overhang the aperture in the base member 52. By using the foregoing procedure, it is possible to fabricate electrode apertures of many different three-dimensional configurations.

FIRST EXAMPLE

Figure 4:
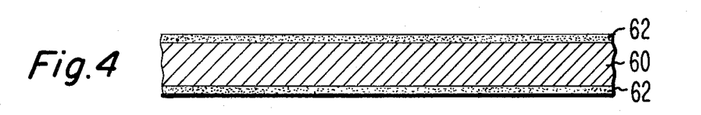
Figure 5:
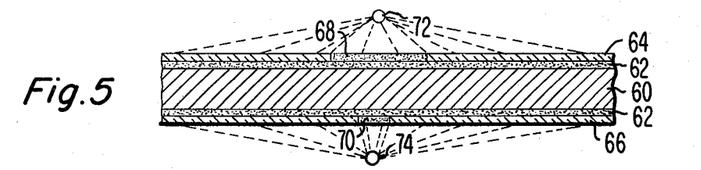
Figure 6:
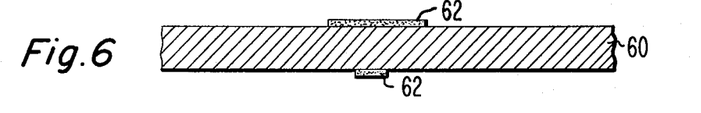
Figure 7:
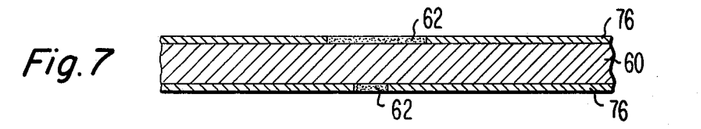
Figure 8:
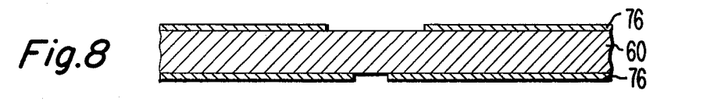
Figure 9:
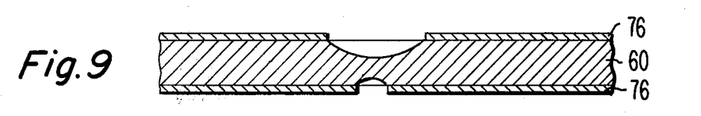
Figure 10:
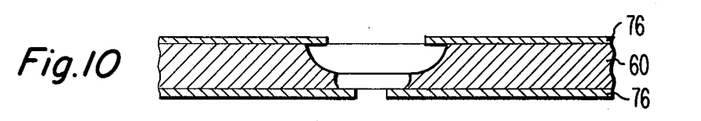

FIGS. 3 through 10 illustrate the sequential steps of one variation of the novel method of fabricating a three dimensional grid aperture. The variation starts with an electrically conductive unapertured grid base member 60 shown in FIG. 3. The base member 60 is coated on both sides with a positive photoresist 62 as shown in FIG. 4. Next, a pair of photomaster plates 64 and 66 are placed against both sides of the photoresist coatings 62. The photomaster plates 64 and 66 have opaque elements 68 and 70, respectively, at the location of an intended aperture. The photoresist coatings 62 then are exposed through the photomaster plates 64 and 66 by light sources 72 and 74 located on opposite sides of the base member 60, as shown in FIG. 5. Now the photoresist coatings 62 are developed and all portions of them except at the intended aperture locations, are removed, as shown in FIG. 6. Thereafter, the parts of the base member 60 which are not covered by the remaining photoresist coatings 62 are plated with an electrically conductive second material to provide overlying layers 76 of different composition than that of the base member 60, as shown in FIG. 7. Next the remaining photoresist coating 62 is removed, as shown in FIG. 8. Now the base member 60 is etched from both sides through the openings in the overlying layers 76 where the remaining photoresist coating 62 was removed, as shown in FIG. 9, with an etchant that only etches the base member 60 but not the overlying layers 76. Etching is continued until the overlying layers 76 are sufficiently undercut so that they overhang the aperture in the base member 60.

SECOND EXAMPLE

Figure 11:
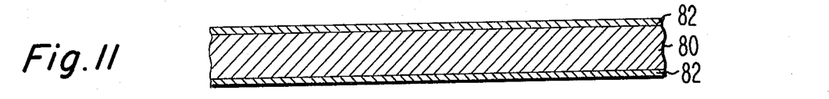
Figure 12:
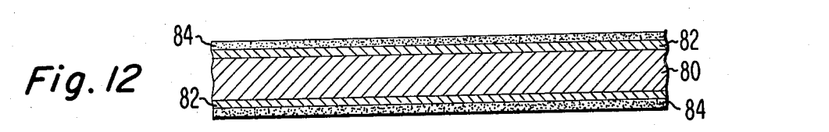
Figure 13:
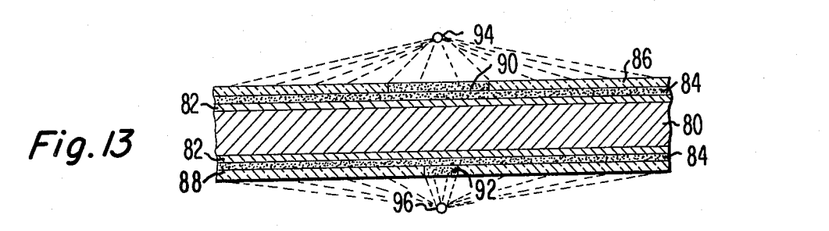
Figure 14:
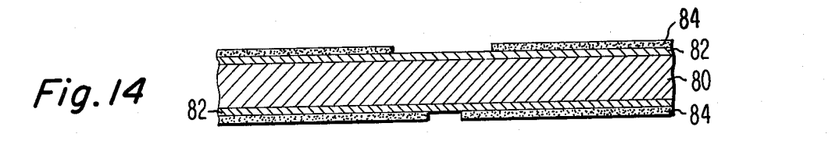
Figure 15:
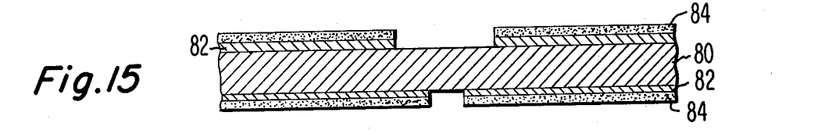
Figure 16:
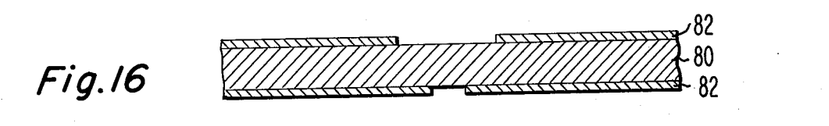
Figure 17:
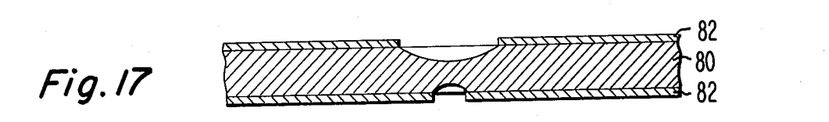
Figure 18:
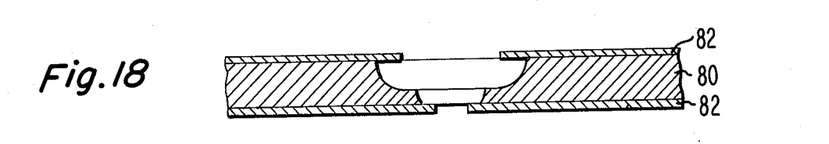

FIGS. 11 through 18 illustrate the sequential steps of a second variation in method of forming a three dimensional grid aperture. This variation starts with an electrically conductive base member 80 of a first material having overlying layers 82 of a second material laminated to both sides thereof, as shown in FIG. 11. The overlying layers 82 are coated with a negative photoresist coating 84, as shown in FIG. 12. Next, a pair of photomaster plates 86 and 88 are placed against the photoresist coatings 84. Each of theses plates 86 and 88 has an element 90 and 92, respectively, at the location of an intended aperture. The photoresist coatings 84 are then exposed through the photomaster plates 86 and 88 by light sources 94 and 96 located on opposite sides of the base member 80, as shown in FIG. 13. Now the photoresist coatings 84 are developed and the portions of the photoresist coatings 84 at the locations of the intended aperture are removed, as shown in FIG. 14. The laminated overlying layers 82 now are etched through the openings in the photoresist coatings 84, as shown in FIG. 15. Thereafter, the photoresist coatings 84 are removed, as shown in FIG. 16, and the base member 80 is etched through the openings in the overlying layers 82, as shown in FIG. 17. Etching is continued until the overlying layers 82 are sufficiently undercut so that they overhang the aperture in the base material 80.

THIRD EXAMPLE

Figures 19, 20:
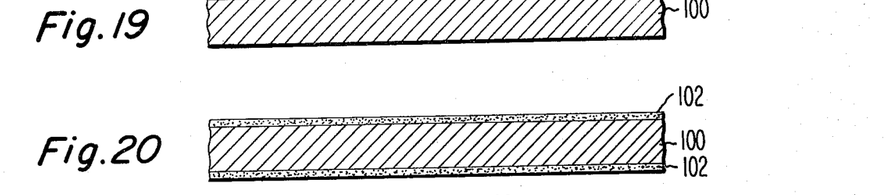
Figure 21:
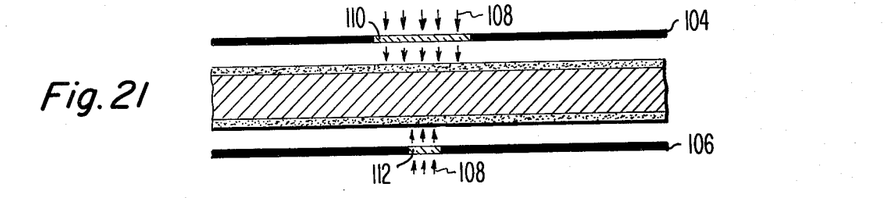
Figure 22:
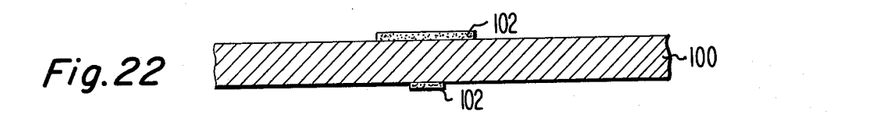
Figure 23:
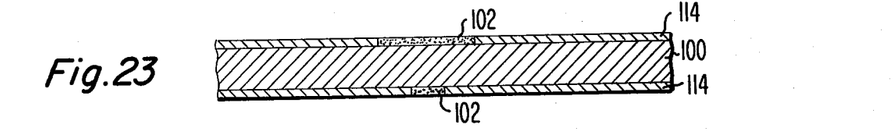
Figure 24:
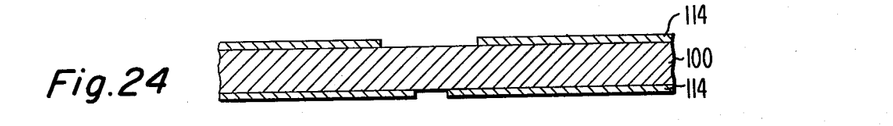
Figure 25:
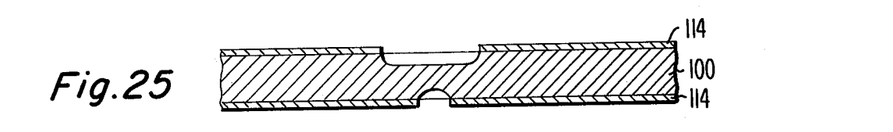
Figure 26:
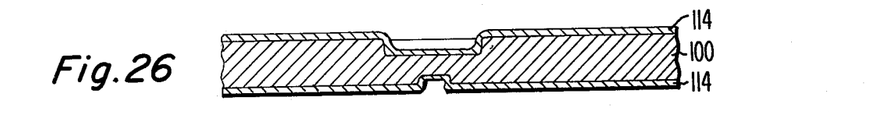
Figure 27:
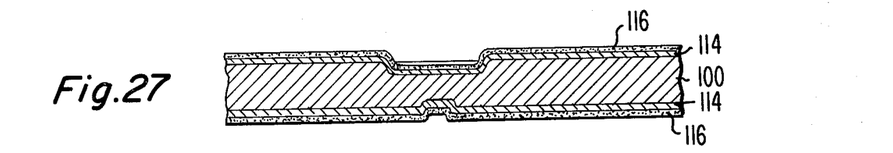
Figure 28:
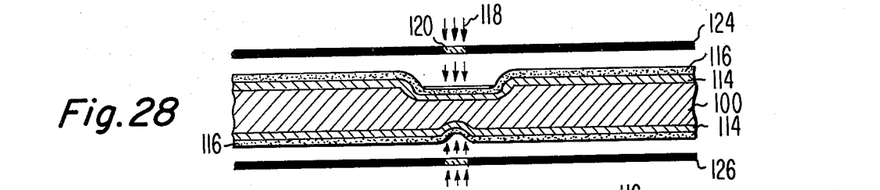
Figure 29:
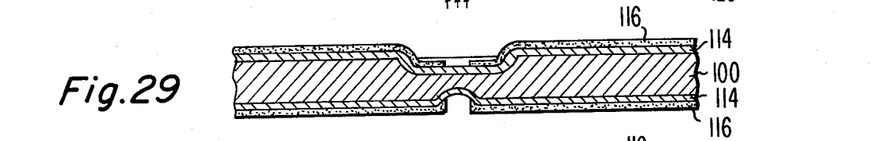
Figure 30:
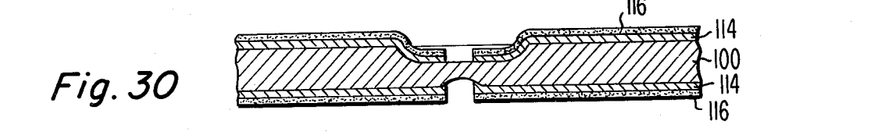
Figure 31:
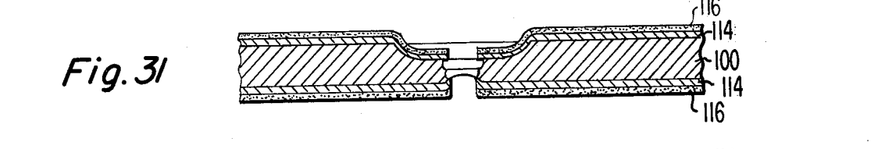
Figure 32:
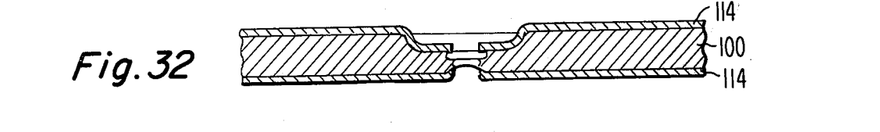

FIGS. 19 through 32 illustrate the sequential steps of a third variation in method of fabricating a three dimensional grid aperture. In this variation a base member 100 of a first material, shown in FIG. 19, is coated with a negative photoresist coating 102, as shown in FIG. 20. Next, two photomasters 104 and 106 are positioned on opposite sides of the base member 100 and the photoresist coatings 102 are exposed by light 108 projected through clear openings 110 and 112 in the photomasters 104 and 106, respectively, as shown in FIG. 21. The openings 110 and 112 are positioned at the locations of an intended aperture. Now, the photoresist coatings 102 are developed and the unexposed portions of the photoresist coatings are removed, as shown in FIG. 22. Thereafter, the exposed portions of the base member 100 are plated with overlying layers of a second material 114, as shown in FIG. 23, and the remaining photoresist coatings 102 are removed, as shown in FIG. 24. The base member 100 now is partially etched through the openings in the overlying layers 114, as shown in FIG. 25. Next, the etched areas of the base member 100 are plated with the same material as the overlying layer 114, as shown in FIG. 26, and the plating and overlying layer 114 is coated with a positive photoresist coating 116, as shown in FIG. 27. The photoresist coatings 116 then are exposed by light 118 projected through clear openings 120 and 122 in a second set of photomaster plates 124 and 126, respectively, as shown in FIG. 28. The size of the openings 120 and 122 in the plates 124 and 126 are substantially smaller than the openings 110 and 112 in the first set of photomasters 104 and 106. Following exposure, the photoresist coatings 116 are developed and the exposed portions are removed, as shown in FIG. 29. Next, the overlying layers 114 are etched through the openings in the photoresist coatings 116, as shown in FIG. 30. Thereafter, the base member 100 is etched through the etched openings in the overlying layers 114 until a desired sized aperture is formed in the base member 100, as shown in FIG. 31. Finally, the photoresist coatings 116 are removed leaving the completed grid aperture, as shown in FIG. 32.

FOURTH EXAMPLE

Figure 33:
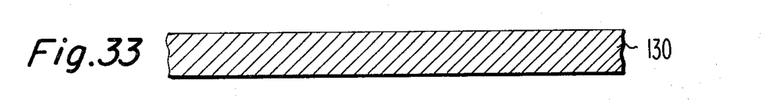
Figure 34:
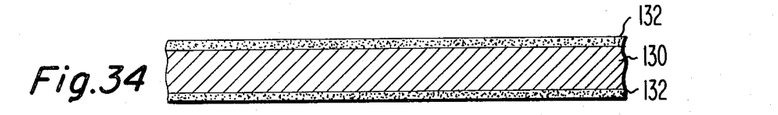
Figure 35:
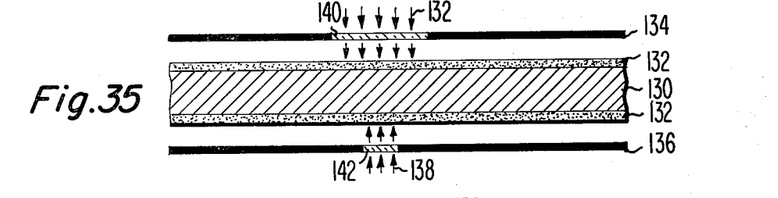
Figure 36:
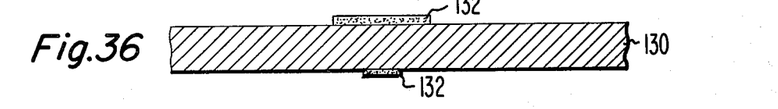
Figure 37:
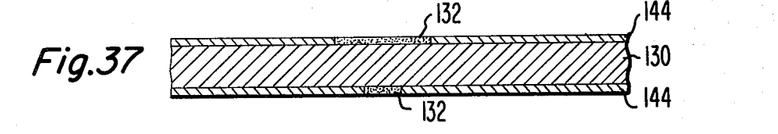
Figure 38:
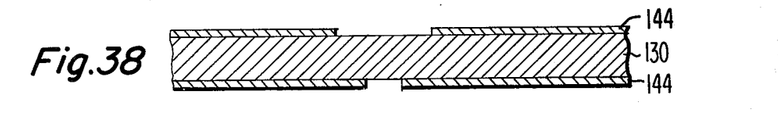
Figure 39:
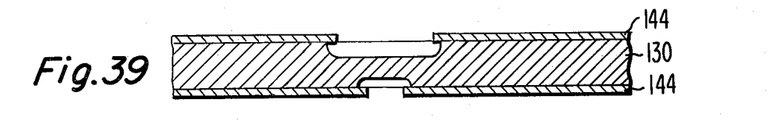
Figure 40:
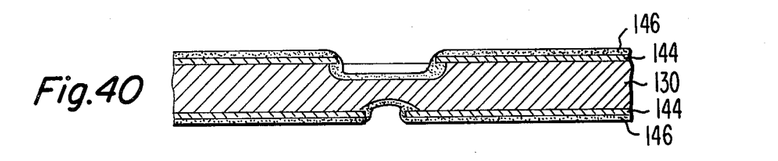
Figure 41:
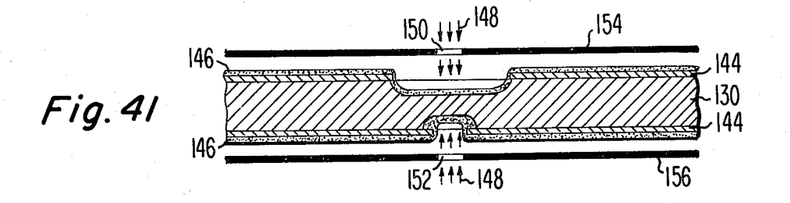
Figure 42:
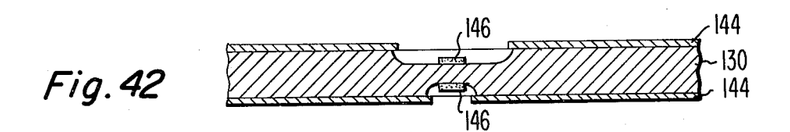
Figure 43:
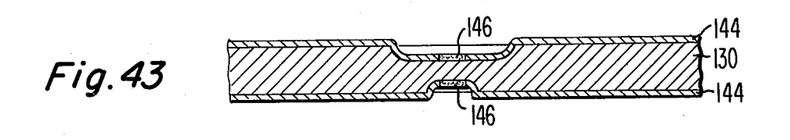
Figure 44:
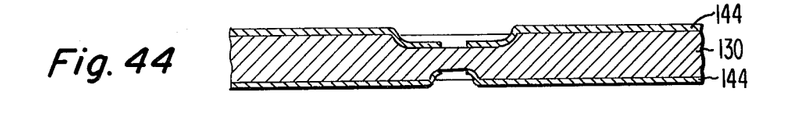
Figure 45:
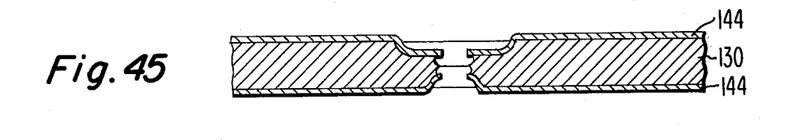
Figure 46:
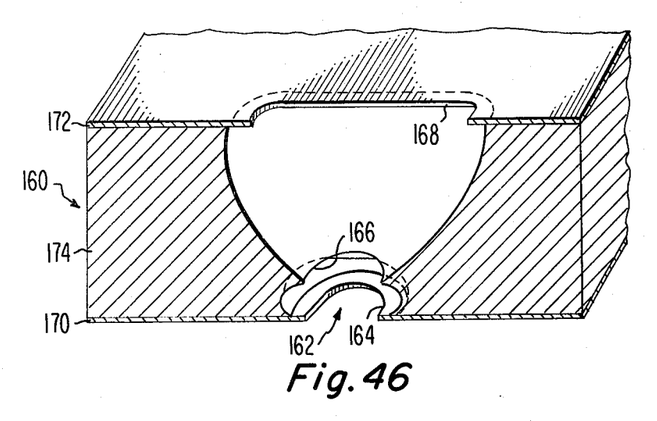
FIGS. 46-49 are fragmentary perspective sectional views of four different grids showing four different types of apertures.
Figure 47:
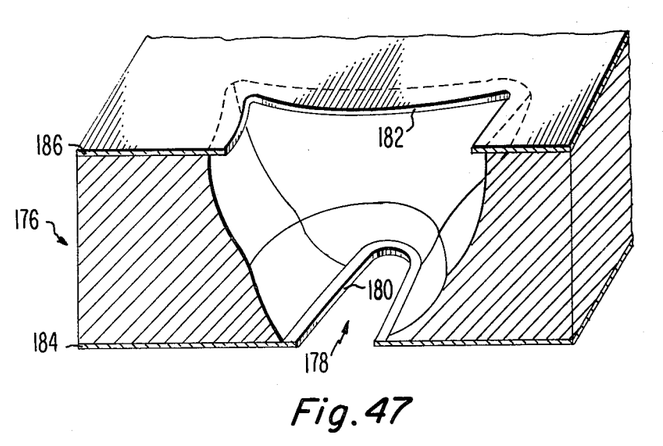
Figure 48:
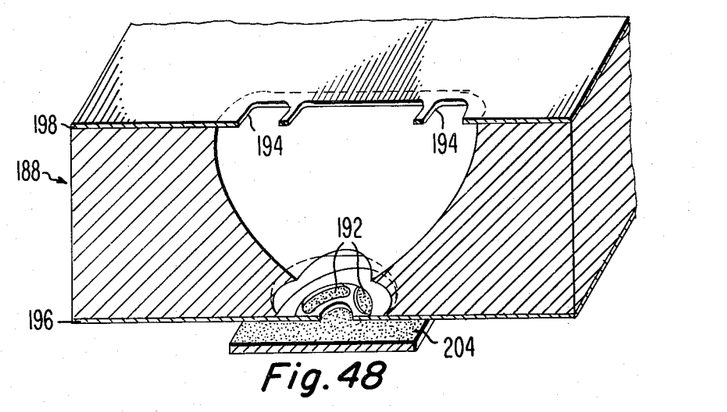

FIGS. 33 and 45 illustrate the sequential steps of a fourth variation in method of fabricating a three dimensional grid aperture. In this variation, a base member 130 of a first material shown in FIG. 33, first is coated with a negative photoresist coating 132, as shown in FIG. 34. Next, two photomasters 134 and 136 are positioned on opposite sides of the base member 130 and the photoresist coatings 132 are exposed by light 138 projected through clear openings 140 and 142 in the photomasters 134 and 136, respectively, as shown in FIG. 35. Thereafter, the photoresist coatings 132 are developed and the unexposed portions are removed, as shown in FIG. 36. Now the exposed portions of the base member 130 are plated with overlying layers 144 of a second material, as shown in FIG. 37. Next, the remaining photoresist coatings 132 are removed, as shown in FIG. 38, and the base member 130 is partially etched through the openings in the overlying layers 144, as shown in FIG. 39. Now the overlying layers 144 and the etched portion of the base member 130 are coated with a negative photoresist coating 146, as shown in FIG. 40, and the photoresist coatings 146 are exposed by light 148 projected through clear openings 150 and 152 in a second set of two photomasters 154 and 156, respectively, which are positioned on opposite sides of the base member 130, as shown in FIG. 41. Following exposure, the photoresist coatings 146 are developed and the unexposed portions are removed, as shown in FIG. 42. Next, the exposed etched portion of the base member 130 is plated with the same material as in the overlying layers 144, as shown in FIG. 43 and the remaining photoresist coatings 146 are removed, as shown in FIG. 44. Finally, the base member 130 is etched through the openings in the overlying layers 144 until an aperture of the desired size is formed in the base member 130.

Figure 49:
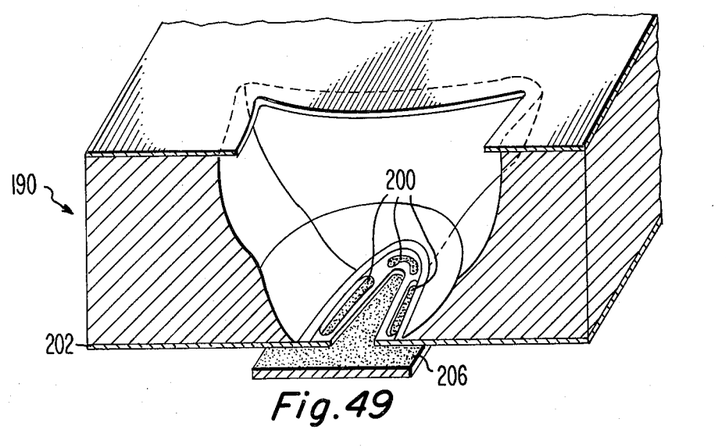

In addition to the foregoing four examples, many different variations are also within the scope of the present invention including various combinations of the foregoing examples. For instance, since FIGS. 9 and 25 are similar, the portion of the method of the third example, shown in FIGS. 26 through 32, could follow the portion of the method of the first example, shown in FIGS. 3 through 9. By using the present novel method, various shaped three dimensional apertures may be formed in a grid electrode. Grids having four different apertures are shown in FIGS 46–49. In the grid 160, shown in FIG. 46, an aperture 162 is formed having three predominent restrictions 164, 166 and 168 in the direction of electron beam travel. Two of these restrictions 164 and 168 are formed by the overhang in the two second material layers 170 and 172 and the third restriction 166 is formed in the base member 174. In the grid 176 of FIG. 47, an aperture 178 is formed with only two predominent restrictions 180 and 182. Both of these restrictions 180 and 182 are in the second material layers 184 and 186, respectively. The grid 188 of FIG. 48 and the grid 190 of FIG. 49 are modifications of the grids shown in FIGS. 46 and 47, respectively. The grid 188 of FIG. 48 has additional apertures 192 and 194 formed in the overhanging portions of the two second material layers 196 and 198, respectively, and the grid 190 of FIG. 49 has additional apertures 200 formed in one second material layer 202. The purpose of these additional apertures is to converge multiple areas of cathodes 204 and 206, respectively, to the beam cross-over. They also can be used to form a columnar beam with no cross-over which would pass through the main focus lens with a minimal width.

In all of the foregoing examples, the preferred material for the base material is steel and the preferred material for the second material is nickel. The preferred positive photoresist is one such as manufactured by Shipley under the designation AZ1350B. The preferred negative photoresist is one such as manufactured by Kodak under the designation Kodak Photo Resist. The preferred etchant for etching the steel base material is ferric sulfate and the preferred etchant for the nickel second material is ferric chloride.

What is claimed is:

1. A method of making a grid for a cathode-ray tube electron gun, comprising the steps of coating both sides of an electrically conductive base member of a first material with a photoresist, exposing the photoresist on both sides of said base member through two related photomasters, each photomaster having a pattern including at least one element corresponding to an intended aperture to be formed in the grid, removing all portions of the photoresist except the portions corresponding to the pattern element locations, plating the portions of the base member where the photoresist has been removed with an electrically conductive second material, removing the portions of the photoresist corresponding to the pattern element locations, simultaneously etching the base member from both sides through openings in the second material plating where the photoresist corresponding to the pattern element locations was located, until an aperture of sufficient size is formed that the second material plating overhangs the aperture in the base member.

2. A method of making a grid for a cathode-ray tube electron gun, comprising the steps of coating both surfaces of an unapertured grid with a photoresist wherein said unapertured grid comprises an electrically conductive base member of a first material and an electrically conductive second material laminated to the surfaces of the base material, exposing the photoresist on both surfaces of said unapertured grid through two related photomasters, each photomaster having a pattern including at least one element corresponding to an intended aperture to be formed in the grid, removing only the portions of the photoresist corresponding to pattern element locations, simultaneously etching the laminated second layer through openings in the photoresist formed when portions of the photoresist are removed, to the base member, simultaneously etching the base member from both sides through etched openings in the laminated second material until an aperture of sufficient size is formed that the laminated second material overhangs the aperture in the base member.

3. A cathode-ray tube electron gun having a grid made by the method of claim 1 or 2.

* * * * *

Disclaimer

4,318,026.—*Ralph J. D'Amato,* Lancaster, Pa. METHOD OF MAKING A GRID FOR A CATHODE-RAY TUBE ELECTRON GUN. Patent dated Mar. 2, 1982. Disclaimer filed Jan. 30, 1984, by the assignee, *RCA Corp.*

Hereby enters this disclaimer to all claims of said patent.
[*Official Gazette March 27, 1984.*]